United States Patent [19]

Baron et al.

[11] Patent Number: 5,976,602
[45] Date of Patent: Nov. 2, 1999

[54] METHOD OF FORMULATING ACIDIFIED COLA BEVERAGES AND COMPOSITIONS SO FORMULATED

[75] Inventors: Robert Baron, Phillipsburg; Lisa Y. Hanger, Basking Ridge, both of N.J.

[73] Assignee: Nutrinova, Inc., Somerset, N.J.

[21] Appl. No.: 09/072,775

[22] Filed: May 6, 1998

[51] Int. Cl.[6] .................................................... A23L 1/09
[52] U.S. Cl. ............................................ 426/548; 426/590
[58] Field of Search ...................................... 426/550, 548

[56] References Cited

U.S. PATENT DOCUMENTS

| | | | |
|---|---|---|---|
| 4,158,068 | 6/1979 | Lipinski et al. | 426/548 |
| 4,495,170 | 1/1985 | Beyts et al. | 424/48 |
| 4,622,233 | 11/1986 | Torres | 426/548 |
| 5,474,791 | 12/1995 | Zablocki et al. | 426/548 |

OTHER PUBLICATIONS

Abstract of Robert F. Baron and Lisa Hanger, published Jul. 1996.

*Primary Examiner*—David Lacey
*Assistant Examiner*—Hao Mai
*Attorney, Agent, or Firm*—Michael W. Ferrell

[57] ABSTRACT

Colas are prepared by mixing cola flavor, caramel color, and optionally caffeine with carbonated water, aspartame, acesulfame potassium and an acid component wherein the weight ratio of aspartame to acesulfame potassium is from about 1:1 to about 9:1 and (b) maintaining the admixture at a pH of from about 2.5 to about 3.3 with the proviso that the pH is at least about 2.5 or −0.05 R+2.9 whichever is the greater and further wherein the pH is less than about 3.3 or −0.06 R+3.4 whichever is the lesser; where R is the weight ratio of aspartame to acesulfame potassium.

20 Claims, 3 Drawing Sheets

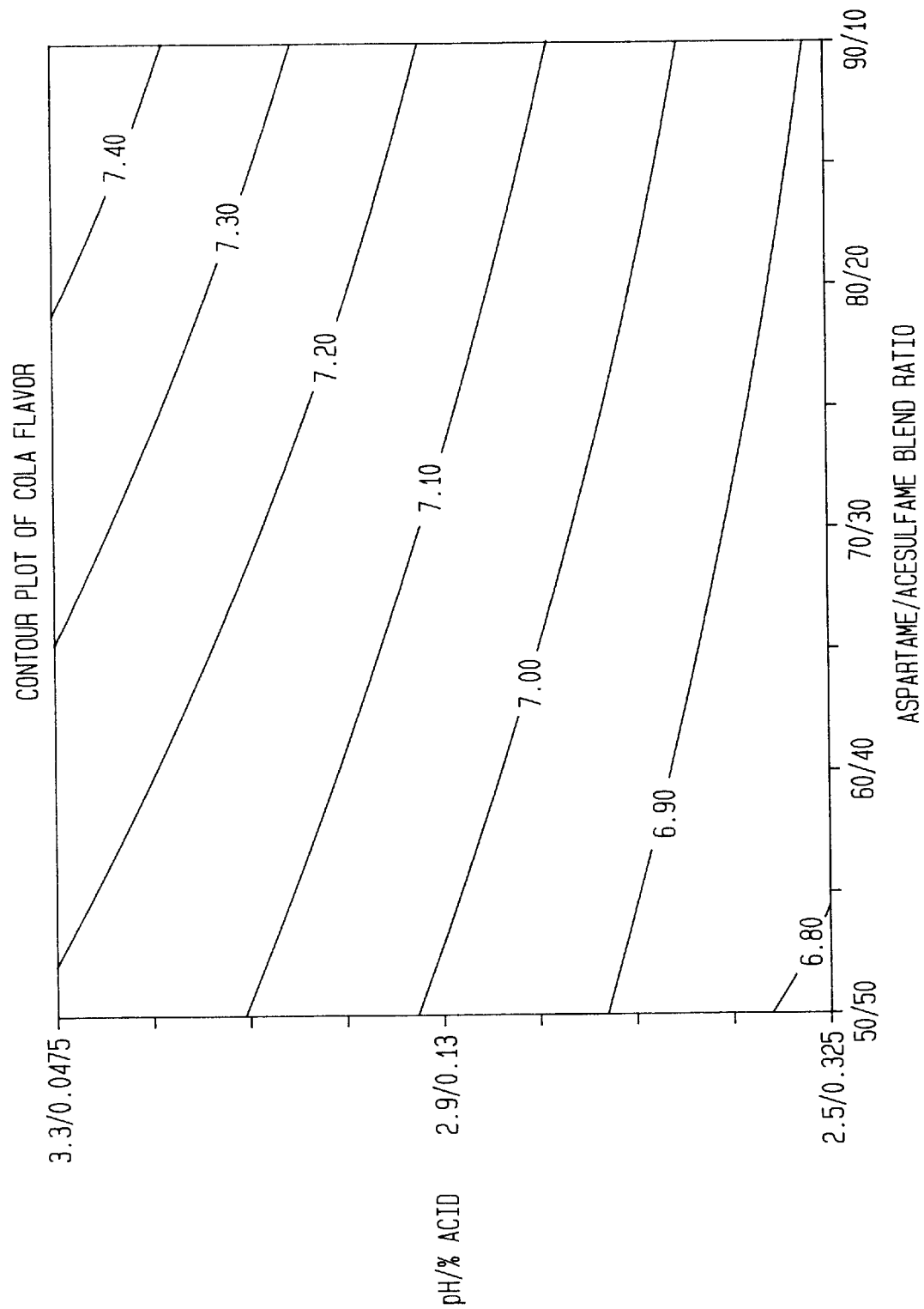

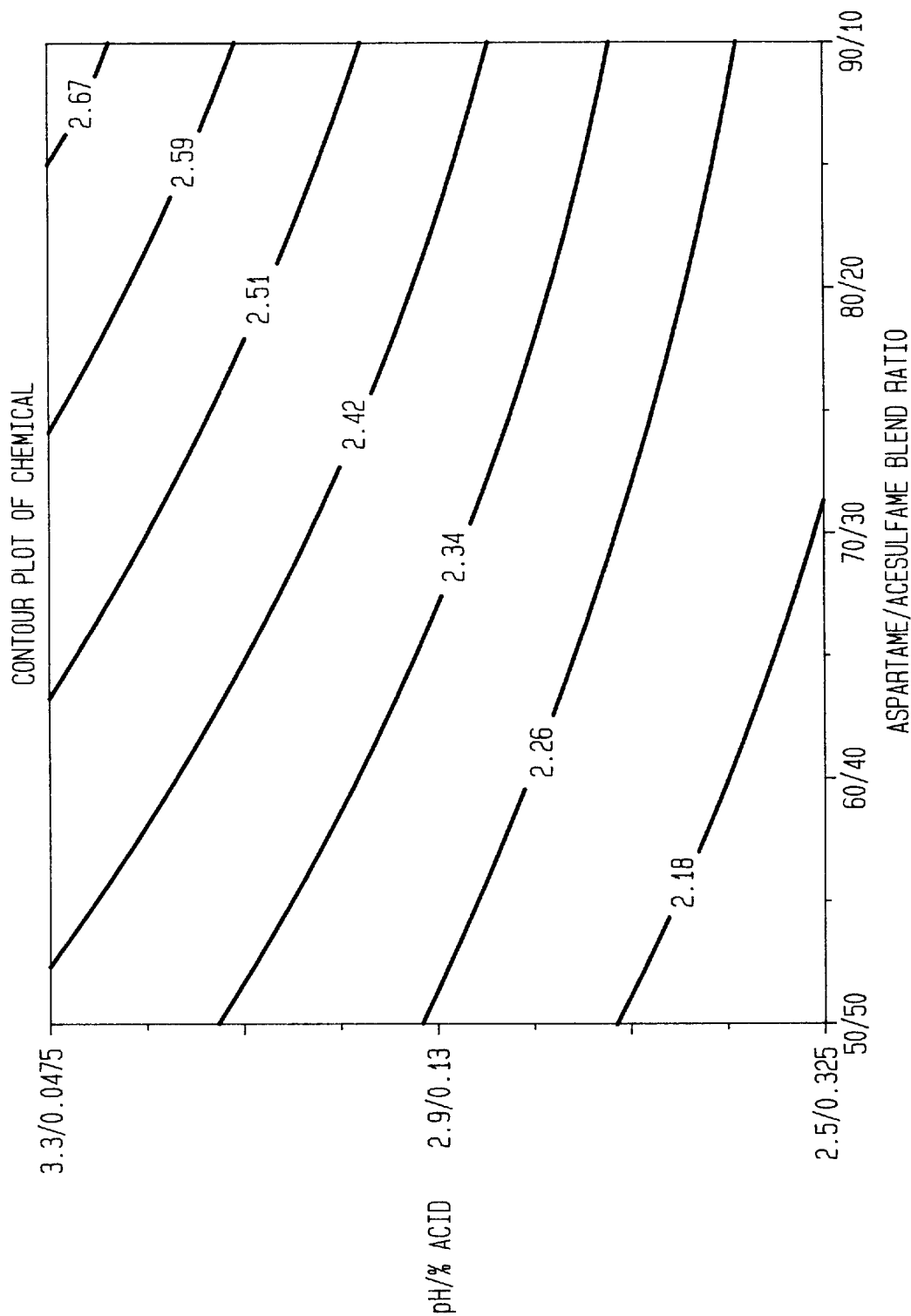

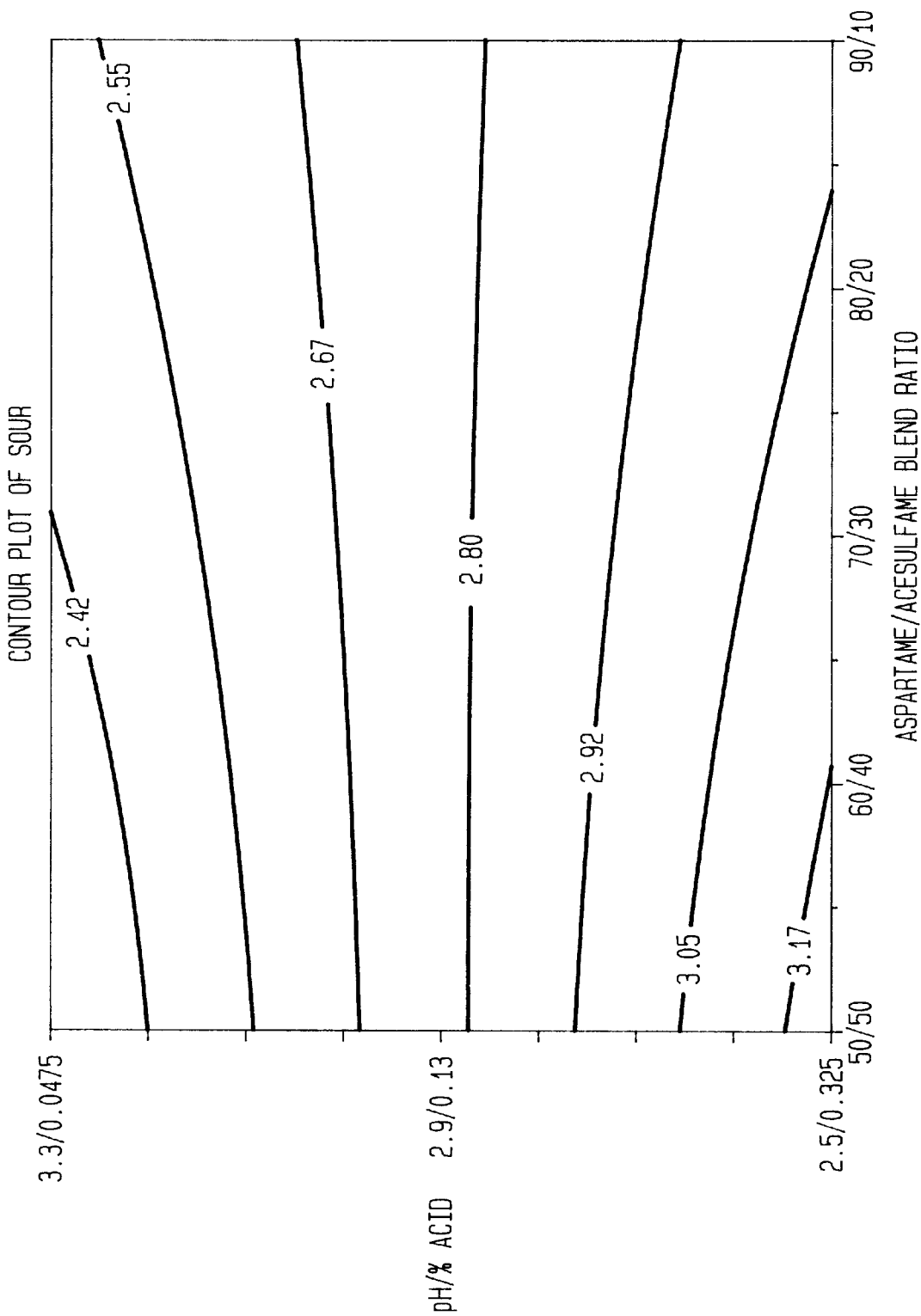

METHOD OF FORMULATING ACIDIFIED COLA BEVERAGES AND COMPOSITIONS SO FORMULATED

TECHNICAL FIELD

The present invention relates generally to formulating cola beverage compositions and more particularly to cola beverage compositions sweetened with a blend of acesulfame potassium and aspartame.

BACKGROUND OF INVENTION

Blends of acesulfame potassium and aspartame are known to be a preferred high intensity sweetener composition; as exemplified in U.S. Pat. No. 4,158,068 to Von Rymon Lipinski et al. High intensity sweetener compositions are useful in cola beverage recipes as is described, for example, in U.S. Pat. No. 5,474,791 of Zablocki et al, which further describes the use of tamarind abstract in beverages. The '791 patent notes that the standard pH for a cola beverage is from about 3.05 to about 3.10 (See Column 2, lines 19–21). Such is apparently the case, notwithstanding the fact that in many respects higher, or more neutral, pH ranges have benefits in terms of extending the shelf life of aspartame containing products.

Due to the complex interaction of ingredients on the palate, it is not possible to predict the effect of ingredient combinations on flavor quality of cola formulations. One formulation is found in U.S. Pat. No. 4,495,170 to Beyts et al, example 2 at Column 6 of the '170 patent:

| Ingredients | Parts By Weight |
| --- | --- |
| Phosphoric Acid | 12 |
| Sodium Citrate | 1 |
| Sodium Benzoate | 2.5 |
| Caramel | 25 |
| Cola Essence | 11 |
| Saccharin | 1.7 |
| Chlorodeoxysugar | 0.8 |
| Carbonated Water | 9946.0 |

Even small variations in pH or ingredients can have unacceptable results in terms of the flavor, especially the cola flavor strength, the preferred "sour" taste; and especially with respect to high intensity sweeteners, the observed level of chemical taste or chemical aftertaste.

SUMMARY OF INVENTION

It has been found in accordance with the present invention that acidified cola beverages may be formulated over a broad range of pH while maintaining acceptable taste parameters by utilizing blends of aspartame and acesulfame potassium. In a first aspect of the invention, an inventive method generally includes:

(a) providing in admixture cola flavor, caramel color, and optionally caffeine with carbonated water, aspartame, acesulfame potassium and an acid component wherein the weight ratio of aspartame to acesulfame potassium is from about 1:1 to about 9:1 and (b) maintaining the admixture at a pH of from about 2.5 to about 3.3 with the proviso that the pH is at least about 2.5 or −0.05 R+2.9 whichever is the greater and further wherein the pH is less than about 3.3 or −0.06 R+3.4 whichever is the lesser; where R is the weight ratio of aspartame to acesulfame potassium. Caffeine is provided in many cases.

The condition that the pH is at least about 2.5 or −0.05 R+2.9 whichever is the greater and less than about −0.06 R+3.4 whichever is the lesser approximates the area on FIG. 2 bounded on its lower limit by the line where chemical taste=2.26 and bounded at its upper limit by the contour line where chemical taste=2.51 or pH =3.3.

The acid component ordinarily includes phosphoric acid and citric acid; but may include either both and/or their alkali metal salts, sodium being the most typical.

In relatively high pH applications, the pH of the beverage is maintained at a pH of about 3.15 to about 3.3.

Likewise, in many cases the weight ratio of aspartame to acesulfame potassium is from about 1:1 to about 4:1 or at even higher pH values from about 1:1 to about 7:3. At pH values of about 2.9 and higher the weight ratio of aspartame to acesulfame potassium is preferably from about 1:1 to about 6:4, this being in particular the case at pH values from 3.15 to about 3.3.

In another aspect of the invention, compositions are provided in a pH range of from about 2.5 to about 3.3 in accordance with the above-described formulation method.

BRIEF DESCRIPTION OF THE DRAWINGS

For the purpose of illustrating the invention, this is shown in the drawings a form which is presently preferred; it being understood, however, that this invention is not limited to that which is shown.

FIG. 1 is a contour plot of cola flavor scores by acid level (pH/% acid, ordinate) and sweetener blend (weight ratio aspartame/acesulfame potassium abscissa) for a cola flavored beverage.

FIG. 2 is a contour plot of chemical scores by acid level (pH/% acid, ordinate) and sweetener blend (weight ratio aspartame acesulfame potassium, abscissa) for a cola flavored beverage.

FIG. 3 is a contour plot of sour scores by acid level (pH/% acid, ordinate) and sweetener blend (weight ratio aspartame/ acesulfame potassium, abscissa) for a cola flavored beverage.

DETAILED DESCRIPTION OF THE INVENTION

A cola flavor refers to either a natural or artificial flavor. Such cola flavors are commercially available. Commercial cola flavors are available, for example, from International Flavor and Fragrances, Dayton, N.J.; Artificial—#13573011 and Natural #K3559549. Commercial cola flavors are also available from Tastemaker, Cincinnati, Ohio, and Givaudan Roure, Clifton, N.J. Acid refers an ingredient that contributes sourness to the beverage and is added to balance the flavor profile by reducing chemical or sweetener side tastes. Acids may include malic acid, citric acid, phosphoric acid or combinations thereof.

Optimum cola beverages are defined as having higher cola scores, balanced sweetness and sour levels, and low chemical side tastes. The beverage includes cola flavor, a sweetener blend of 10–50% weight of the blend of acesulfame potassium, and acid level of between 2.5–3.3 pH (0.325–0.0475% finished beverage). The cola flavor intensity varies with the sweetener blend ratio and acid levels as shown in FIG. 1.

A preferred cola flavored beverage has a pH of 2.5–3.3 with an aspartame/acesulfame potassium blend from 50/50 to 90/10.

Beverage Formulation

Cola flavored carbonated beverages were formulated with varying aspartame and acesulfame potassium levels (90/10–50/50 sweetness contribution) and varying acid level (0.05–0.005% in the final beverage). Additionally, a sucrose control and aspartame control were included in the study. See Table 1. The acid levels resulted in a pH range of 2.5–3.3 (0.325–0.0475% acid) in the final beverages.

Concentrate preparation was the first phase of beverage development. The concentrate was prepared by mixing the phosphoric acid (75% Rhone-Poulenc), citric acid (anhydrous, ADM, Decatur, Ill.), caffeine (Mallinckrodt, Paris, Ky.), Caramel Color (DS400, Sethness, Chicago, Ill.), Cola Flavor (SN018976, International Flavors and Fragrances, Dayton, N.J.), sweeteners (Acesulfame potassium—Sunett® Brand Sweetener—Nutrinova, Inc., Somerset, N.J.; aspartame—Holland Sweetener, Atlanta, Ga.; sucrose (Mallinckrodt, Paris, Ky.), and water (distilled—American Eagle, Harwick, N.J.). The concentrate was blended until all ingredients were dissolved (30–40 minutes) using a magnetic stirring plate. Fifty milliliters of the concentrate were added to 250 ml of carbonated water which completed the preparation of the cola beverage.

Taste Testing

Six previously trained descriptive panelists (4 female, 2 male, age 34–53) participated in three orientation/ballot development sessions. During these sessions, panelists generated characteristics to describe the sample set. During subsequent sessions practice with references and products was conducted to determine the final ballot. Final terms on the ballot included cola, sweet, chemical, sour, astringency, and blendedness. See Table 2 for reference values. Standard references (Meilgaard et al *Sensory Evaluation Techniques*, CRC Press Inc., Boca Raton, Fla. 19901, 1990) for flavor (universal scale) and taste (basic) attributes were used. A 15 cm line scale was used in accordance with Chapter 8.

Panelists evaluated six (40 ml) samples per 2 hour session for 4 sessions. Attributes were scored using a 15 cm unstructured line scale. The steps in each evaluation session included reference review, and evaluation of experimental samples. Panelists cleared the palate between samples with unsalted crackers and spring water. A 10 minute rest period was used between samples.

A randomized complete block design was used for sensory testing with session as a block. Three replications of each design point were completed.

Analysis of Data

The scores were first analyzed using the General Linear Model (GLM) in SAS® (SAS Institute, Cary, N.C.) with panelists, acid level, sweetener blend, and flavor type included as the main effects. Additionally separate analyses were run for natural and artificial flavor samples. MODDE (Umetri, UMEA, Sweden) was used to map the experiment using Response Surface Modeling (RSM).

RESULTS

The result of the foregoing is set forth in Table 3.

The present invention may be embodied in other specific forms without departing from the spirit or essential attributes thereof and, accordingly, reference should be made to the appended claims rather than to the foregoing specification, as indicating the scope of the invention.

TABLE 1

Concentrate formulation for carbonated cola beverage*.

| Ingredient | 50/50 pH 2.5 (0.325% acid) | 90/10 pH 2.5 (0.325% acid) | 50/50 pH 3.3 (0.0475% acid) | 90/10 pH 3.3 (0.0475% acid) | 70/30 pH 2.9 (0.13% acid) | Sucrose Control pH 2.9 (0.13% acid) | APM Control pH 2.9 (0.13% acid) |
| --- | --- | --- | --- | --- | --- | --- | --- |
| Sucrose (g) | 0.000 | 0.000 | 0.000 | 0.000 | 0.000 | 345.000 | 0.000 |
| Aspartame (g) | 0.495 | 1.338 | 0.495 | 1.338 | 0.810 | 0.000 | 1.650 |
| Acesulfame Potassium (g) | 0.495 | 0.147 | 0.495 | 0.147 | 0.345 | 0.000 | 0.000 |
| Phosphoric Acid (75%) (ml) | 2.000 | 2.000 | 1.500 | 1.500 | 0.700 | 0.700 | 0.700 |
| Citric Acid (g) | 0.125 | 0.125 | 0.125 | 0.125 | 0.125 | 0.125 | 0.125 |
| Caffeine (g) | 0.400 | 0.400 | 0.400 | 0.400 | 0.400 | 0.400 | 0.400 |
| Caramel Color (g) | 2.200 | 2.200 | 2.200 | 2.200 | 2.200 | 2.200 | 2.200 |
| Cola Flavor (ml) | 1.950 | 1.950 | 1.950 | 1.950 | 1.950 | 1.950 | 1.950 |
| Water (ml) | 493.325 | 491.840 | 492.835 | 492.340 | 493.470 | 149.625 | 492.975 |

*Final beverages were prepared by adding 50 ml of the concentrate to 250 ml of carbonated water.

TABLE 2

| Term | Definition | Reference |
| --- | --- | --- |
| Cola | The aromatic associated with cola syrup. | Cola syrup, universal scale* |
| Sweet | The basic taste associated with sucrose. | Sucrose in water at various concentrations 2.0% = 2, 5.0% = 5, 10.0% = 10 |
| Chemical | The general perception of a chemical characteristic, giving a "flat" taste, does not include medicinal or antiseptic | 0.25 gram of saccharin in 500 ml of water = 8 |
| Sour | The basic taste associated with citric acid | Citric acid in water at various concentrations 0.50 g/L = 2, 0.80 g/L = 5, 1.5 g/L = 10, 2.0 g/L = 15.0 |

TABLE 2-continued

| Term | Definition | Reference |
|---|---|---|
| Astringency | The combination of sensations, dominated by a dry mouth, teeth coating, furry tongue, and some puckering | Alum 0.50 g in 500 ml of water = 6 1.0 g in 500 ml of water = 10 |
| Blendedness | Measure of how well flavors fit | 15 cm scale* |

*References for cola flavor are from the "Universal Scale", wherein the lemon flavor in lemon frosting = 2; the milk flavor in whole milk = 5; the orange flavor in orange juice = 7.5; the grape flavor in grape juice = 10; the cinnamon flavor in cinnamon gum = 12; the coffee flavor in espresso coffee = 14. A score of 15 for blendedness indicates well balanced and no off-taste.

TABLE 3

Means ± standard deviations of descriptive scores of cola flavored beverages by blend ratio and acid (pH) level[1]

| Aspartame/Acesulfame K Blend Ratio | pH/% acid | Cola | Chemical | Sweet | Sour | Astringency | Blended |
|---|---|---|---|---|---|---|---|
| 50/50 | 2.5/0.325 | 6.6 ± 1.7c | 2.0 ± 1.2a | 8.1 ± 1.8c | 3.3 ± 0.7a | 2.8 ± 1.4ab | 6.4 ± 2.2d |
| 90/10 | 2.5/0.325 | 6.7 ± 1.2c | 2.1 ± 1.7a | 9.0 ± 1.1bc | 3.1 ± 0.9c | 3.2 ± 1.1bc | 7.5 ± 1.8bcd |
| 50/50 | 3.3/0.0475 | 7.0 ± 1.0bc | 2.3 ± 1.3a | 8.8 ± 1.0bc | 2.4 ± 0.4c | 2.3 ± 1.1bc | 6.5 ± 1.9cd |
| 90/10 | 3.3/0.0475 | 7.3 ± 1.2ab | 2.6 ± 0.7a | 9.7 ± 0.9ab | 2.6 ± 0.9bc | 2.2 ± 1.1c | 7.6 ± 2.2bc |
| 70/30 | 2.9/0.13 | 7.3 ± 0.9ab | 2.5 ± 1.0a | 9.3 ± 1.6ab | 2.7 ± 1.2bc | 2.2 ± 1.3c | 7.7 ± 2.3b |
| Sucrose Control | 2.9/0.13 | 7.8 ± 0.8a | 0.3 ± 0.8b | 9.9 ± 0.5a | 2.3 ± 0.6c | 2.0 ± 1.2c | 10.3 ± 2.3a |
| APM Control (550 ppm) | 2.9/0.13 | 6.7 ± 0.8c | 2.1 ± 1.4a | 8.8 ± 0.9abc | 2.4 ± 0.7ab | 2.3 ± 1.5a | 7.0 ± 2.0bcd |

[1]15 cm line scale, n = 18; Means within columns followed by like letters are not significantly different at $p < 0.3$

We claim:

1. A method of formulating an acidified cola beverage comprising:
   (a) providing an admixture consisting essentially of cola flavor, caramel color, carbonated water, aspartame, acesulfame potassium and an acid component and optionally caffeine, wherein the weight ratio of the aspartame to the acesulfame potassium is from about 1:1 to about 9:1 and
   (b) maintaining said admixture at a pH of from about 2.5 to about 3.3.

2. The method according to claim 1, wherein caffeine is provided.

3. The method according to claim 1, wherein said acid component includes phosphoric acid.

4. The method according to claim 1, wherein said acid component includes citric acid or an alkali metal salt thereof.

5. The method according to claim 4, wherein said alkali metal is sodium.

6. The method according to claim 1, wherein said acid component consists essentially of a bicomponent mixture of phosphoric acid and citric acid or alkali metal salts thereof.

7. The method according to claim 1, wherein the pH of said admixture is maintained at a pH of about 3.15 to about 3.3.

8. The method according to claim 1, wherein the weight ratio of aspartame to acesulfame potassium is from about 1:1 to about 4:1.

9. The method according to claim 8, wherein the weight ratio of aspartame to acesulfame potassium is from about 1:1 to about 7:3.

10. The method according to claim 9, wherein the weight ratio of aspartame to acesulfame potassium is from about 1:1 to about 6:4.

11. An acidified cola beverage composition having a pH from about 2.5 to about 3.3 and consisting essentially of cola flavor, an acid component, caramel color, aspartame, acesulfame potassium, and optionally caffeine, wherein the weight ratio of the aspartame to the acesulfame potassium is from about 1:1 to about 9:1.

12. The composition according to claim 11, wherein said composition includes caffeine.

13. The composition according to claim 11, wherein said acid component includes phosphoric acid.

14. The composition according to claim 11, wherein said acid component includes citric acid or an alkali metal salt thereof.

15. The composition according to claim 14, wherein said alkali metal salt is sodium.

16. The composition according to claim 11, wherein said acid component consists essentially of phosphoric acid and citric acid or alkali metal salts thereof.

17. The composition according to claim 11, wherein the pH of said composition is from about 3.15 to about 3.3.

18. The composition according to claim 11, wherein the weight ratio of aspartame to acesulfame potassium is from about 1:1 to about 7:3.

19. The composition according to claim 18, wherein the weight ratio of aspartame to acesulfame potassium is from about 1:1 to about 6:4.

20. An acidified cola beverage composition having a pH from about 2.5 to about 3.3 and consisting essentially of cola flavor, an acid component, caramel color, aspartame, acesulfame potassium, an the balance carbonated water, wherein the weight ratio of the aspartame to the acesulfame potassium is from about 1:1 to about 9:1.

* * * * *